United States Patent
Stevens et al.

(10) Patent No.: US 8,296,433 B2
(45) Date of Patent: Oct. 23, 2012

(54) VIRTUALIZATION METHOD AND APPARATUS FOR INTEGRATING ENTERPRISE APPLICATIONS

(75) Inventors: Luis F. Stevens, Milpitas, CA (US); Robert J. Petri, Santa Clara, CA (US); George Mark Scott, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 11/749,124

(22) Filed: May 15, 2007

(65) Prior Publication Data

US 2009/0094364 A1    Apr. 9, 2009

Related U.S. Application Data

(63) Continuation-in-part of application No. 10/444,635, filed on May 22, 2003.

(60) Provisional application No. 60/383,174, filed on May 22, 2002.

(51) Int. Cl.
*G06F 15/173* (2006.01)

(52) U.S. Cl. .......................... 709/226; 225/229; 225/249

(58) Field of Classification Search .......... 709/223–226, 709/229, 249
See application file for complete search history.

(56) References Cited

U.S. PATENT DOCUMENTS

| | | | |
|---|---|---|---|
| 5,905,873 A | 5/1999 | Hartmann et al. | |
| 6,101,528 A | 8/2000 | Butt | |
| 6,334,158 B1 | 12/2001 | Jennyc et al. | |
| 6,463,056 B1 | 10/2002 | Silva et al. | |
| 6,625,168 B1 | 9/2003 | Langer et al. | |
| 6,647,420 B2 * | 11/2003 | Hellbusch et al. | 709/226 |
| 6,651,117 B1 * | 11/2003 | Wilson et al. | 710/33 |
| 6,772,413 B2 | 8/2004 | Kuznetsov | |
| 6,810,427 B1 | 10/2004 | Cain et al. | |
| 6,889,260 B1 | 5/2005 | Hughes | |
| 6,983,449 B2 | 1/2006 | Newman | |
| 7,003,481 B2 | 2/2006 | Banka et al. | |
| 7,162,722 B1 * | 1/2007 | Supinski et al. | 719/310 |
| 7,191,248 B2 | 3/2007 | Chattopadhyay et al. | |
| 7,200,651 B1 | 4/2007 | Niemi | |
| 7,383,355 B1 * | 6/2008 | Berkman et al. | 709/246 |
| 7,610,404 B2 | 10/2009 | Scott et al. | |
| 7,730,182 B2 | 6/2010 | Mital et al. | |
| 7,805,532 B2 | 9/2010 | Pattison et al. | |
| 2002/0013827 A1 | 1/2002 | Edstrom et al. | |
| 2002/0059425 A1 | 5/2002 | Belfiore et al. | |
| 2002/0178254 A1 | 11/2002 | Brittenham et al. | |
| 2002/0194336 A1 | 12/2002 | Kett et al. | |
| 2002/0198734 A1 * | 12/2002 | Greene et al. | 705/1 |
| 2003/0040920 A1 | 2/2003 | Adams et al. | |
| 2003/0101284 A1 | 5/2003 | Cabrera et al. | |
| 2003/0233249 A1 * | 12/2003 | Walsh et al. | 705/1 |
| 2004/0023723 A1 | 2/2004 | Jandel et al. | |

(Continued)

*Primary Examiner* — Mohamed Ibrahim
(74) *Attorney, Agent, or Firm* — Patterson & Sheridan, LLP (57) ABSTRACT

A method and apparatus is provided for integrating an application into a network of computing resources. Applications using this integration have a virtualized access to one or more computing resources associated with the network. Virtualization is generally assured through at least one network connection between the virtual layer and the native network. Together, the virtual access is used to generate a virtual application network capable of providing the application access to the network of computing resources. The application is created into an orchestration of operations to manipulate the one or more computing resources according to a business process. As needed, the application and orchestration can be further partitioning into components to be distributed and executed over the virtual application network using the virtualized access.

19 Claims, 8 Drawing Sheets

U.S. PATENT DOCUMENTS

2004/0073812 A1 4/2004 Wesinger et al.
2004/0226459 A1 11/2004 Hill et al.
2005/0246415 A1 11/2005 Belfiore et al.
2011/0047127 A1 2/2011 Scott et al.
2011/0047293 A1 2/2011 Scott et al.
2011/0047591 A1 2/2011 Scott et al.

* cited by examiner

VIRTUALIZATION METHOD AND APPARATUS FOR INTEGRATING ENTERPRISE APPLICATIONS

CROSS-REFERENCE TO RELATED APPLICATIONS

This application relates to and claims priority in part to U.S. application Ser. No. 10/444,635, filed May 22, 2003 and titled "Application Network Communication Method and Apparatus", which is incorporated herein by reference. This application also relates to the subject matter disclosed in provisional U.S. application Ser. No. 60/383,174, filed May 22, 2002 herewith, titled "Application Network Communication Method and Apparatus", which is hereby incorporated by reference in its entirety.

BACKGROUND OF THE INVENTION

Many companies leverage computer systems and software applications to improve their efficiency and organization in business. Often these systems are integrated together allowing information from one software application or system to be used or analyzed by another software application or system. Benefits associated with integrating and using these computer systems and software in business are numerous and include tighter control over inventory, improved financial forecasting, streamlined information-flow internally and externally and sales force automation.

The various benefits of leveraging computer technology generally justifies the hiring of large information technology (IT) staff to keep these computer systems operational and communicating with each other. Often, these IT departments are saddled with the task of integrating many disparate computer systems and software applications in attempt to make corporate information flow more freely and securely.

Unfortunately, the increasing complexity of integrating these large computer systems and software applications in a company has made systems integration a daunting and expensive task. Systems integration projects have become complicated requiring specialized knowledge of applications, protocols, communications, hardware and other areas that the IT staff at a given company may not possess. Even with the proper knowledge and training, most IT departments are too small to complete large scale systems integration projects in a reasonable time frame.

Consequently, a large number of system integration projects require customized development completed using consultants or outsourced to system integrators that specialize in integrating these large scale systems. The solutions involve integrating the data and business logic between several existing applications and frequently involve complex solutions. Because the work is outsourced and/or complex, these customized solutions can also be very expensive. Maintaining software as the companies grow and their needs change may also cost a great deal of money as the same consultants may be needed after the initial systems integration effort is put in place.

In attempt to reduce costs and expedite the integration, many companies are exploring system integration tools/methodologies as an alternative to customized software development. These solutions include enterprise application integration (EAI) solutions and application server technologies, The EAI solution provides a solution to some of the system integration problems but requires a company to commit to a proprietary platform. Application server solutions are also useful but also involve proprietary protocols. Scalability is also a problem with these methodologies as companies grow and demand more processing power and throughput from their systems. Integrating applications across enterprises presents additional problems dealing with firewalls, security, access control and other systems.

SUMMARY OF THE INVENTION

One aspect of the present invention includes a method, apparatus and computer program product to integrate an application into a network of computing resources. Applications using this integration have a virtualized access to one or more computing resources associated with the network. Visualization is generally assured through at least one network connection between the virtual layer and the native network. Together, the virtual access is used to generate a virtual application network capable of providing the application access to the network of computing resources. The application is created into an orchestration of operations to manipulate the one or more computing resources according to a business process. As needed, the application and orchestration can be further partitioning into components or suborchestrations to be distributed and executed over the virtual application network using the virtualized access.

The details of one or more embodiments of the invention are set forth in the accompanying drawings and the description below. Other Features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Aspects of the present invention provide one or more of the following advantages. Large and small scale applications can be deployed to take advantage of various computing resources available locally or across an enterprise. To simplify access and integration, a virtual application network (VAN) layer is overlaid across an enterprise network potentially having firewalls, access control and other security mechanisms. The VAN layer provides a conduit for the applications to access the computing resources across the enterprise network without reconfiguring the network and access permissions.

Rapid deployment of enterprise applications is possible even when the computing resources are disbursed over wide geographic areas. The VAN layer obviates the need for each application to gain permissions and authorization to access each computing resources at each geographic or logical division of the network. Once the VAN layer is established, the VAN moderates access and security to the computing resources. Applications can be installed locally and remotely more reliably without extensive concern over firewalls and other security mechanisms creating an impasse scenario.

The visualization layer provided by the VAN layer also allows complex distribution and use of computing resources. The virtual access to computing resources provided through the VAN allows the application deployment to be configured and reconfigured quickly. Concern over configuring access for each application to each computing resources is reduced, from the point-of-view of the application, the computing resources are accessed in a uniform manner even though some of the computing resources may be accessed locally and others accessed across great distances spanning multiple network protocols and security methods. Changing the enterprise applications to incorporate new business processes also does not require reconfiguring the entire application and network access methods.

Figure 1:
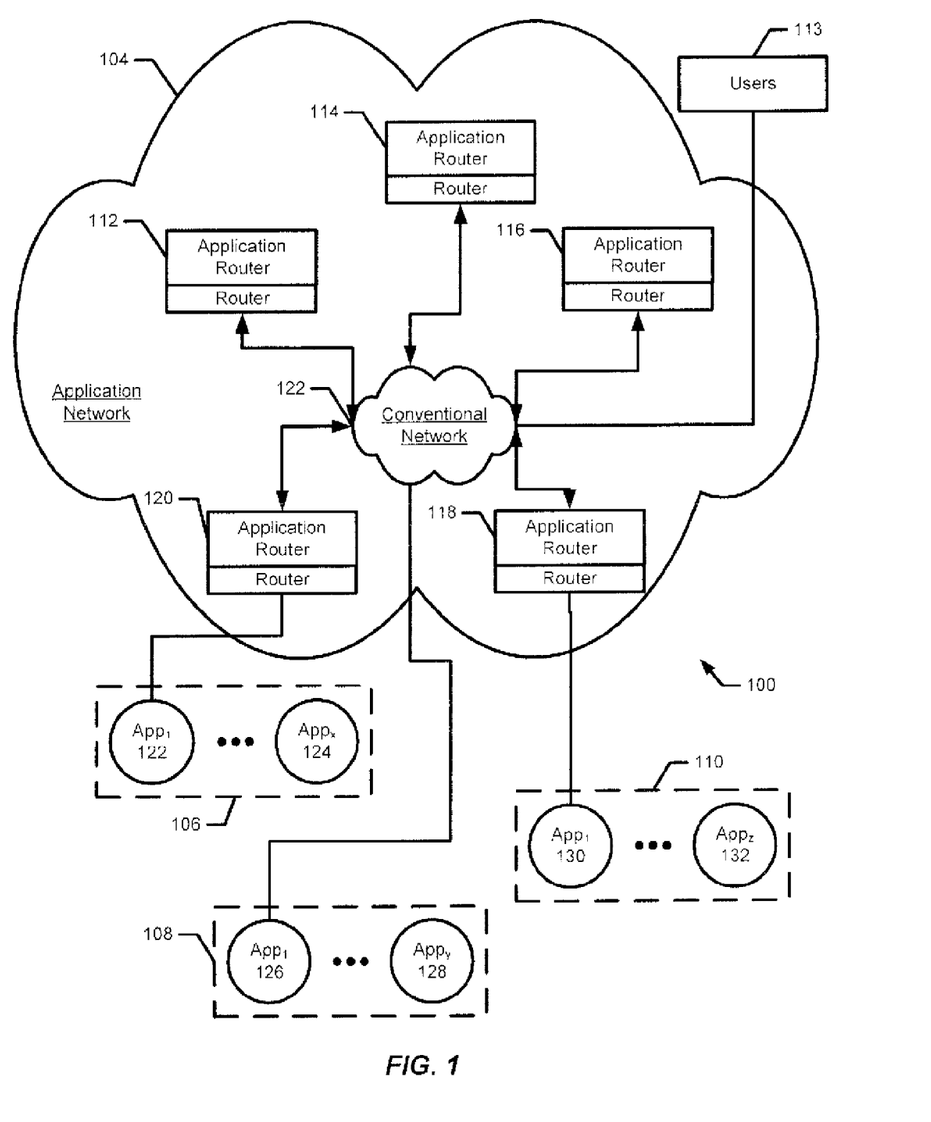
FIG. 1 is a block diagram illustrating a system using application routers in an application network in accordance with one implementation of the present invention.

FIG. 1 illustrates a system 100 using application routers in an application network 104 in accordance with aspects of the present invention. This illustration provides a general overview of using application routers in an enterprise network. Further details on application routers are described in U.S. patent application, Ser. No. 10/555,635 titled, "Application Network Communication Method and Apparatus" as previously incorporated by reference. System 100 includes application router network 104, application set 106, application set 108, application set 110 and users 113 accessing these various application sets over application router network 104. Each application set includes a number of different applications grouped together based on common traits, shared data/information or other types of relationships to each other.

Specifically, application set 106 includes applications $app_1$ 122 through $app_x$ 124, application set 108 includes applications $app_1$ through $app_y$ 128 and application set 110 includes applications $app_1$ 130 through $app_z$ 132. For example, application set 106 may include all the enterprise applications used for a manufacturing division of a company while application set 108 includes enterprise applications used in the sales and marketing division of a company. For the same company, application set 110 may further include corporate enterprise applications concerning financial management, human resources, corporate lax and accounting, research and other corporate-wide functions. These application sets 106, 108 and 110 can be physically located in a single geographic location or distributed internationally. Alternatively, each application set 106, 108 and 110 may correspond to all the enterprise applications within different subdivisions. In this case, each application set 106, 108 and 110 may include enterprise applications for manufacturing, sales, marketing and corporate operations previously described and performed at different corresponding divisions in a company.

In either implementation above or in other configurations, it is often necessary for applications in one or more application sets to communicate across application network 104 in accordance with implementations of the present invention to other applications in other application sets. Typically, enterprise applications need to share critical information about a company or business as well as integrate different workflow requirements, for example, a manufacturing or shipping application providing just-in-time services may need to receive information gathered from purchase orders in a sales force automation application. Workflow in the manufacturing application may require payment to be made in advance before starting manufacturing and also may need to coordinate the manufacturing with another materials procurement or inventory management application located elsewhere in an enterprise. At each junction, applications need to accurately and efficiently share information and ensure certain steps are performed according to specific workflow requirements needed in each area.

Application network 104 can also provides secure communications capabilities between the applications in application sets 106, 108 and 110 and users 113 operating these various applications. In this example implementation, application network 104 includes application router 112, application router 114, application router 116, application router 118 and application router 120 configured to transmit application data to each other over conventional network 122 using secure methods involving encryption, authentication and authorization of users and applications. Application level security features implemented within application routers allows access or denies access based on detailed transactional and/or application information in addition to storage partitions, file distinctions or other logical storage boundaries that may exist.

As described in detail later herein, the VAN layer designed in accordance with aspects of the present invention maintains these and other security features across application network 104. The VAN layer is a part of application network 104 that not only virtualizes the network access but makes the computer resources available to the applications through a specialized interface or API (application programming interface). Through visualization, the VAN layer provides a uniform interface to the applications and the appropriate protocol necessary to implement the various workflow and business processes. Moreover, the VAN layer makes geographic distances, security and other enterprise network considerations transparent to the one or more different applications operating within application network 104.

Specific operational details associated with a business process and the corresponding applications determine the logical flow of data, for example, a first application may be granted access to data from a second application if the data associated with the second application was previously or originally created by the first application. Of course, the first application can be granted various levels or read and/or write permissions by the second application explicitly after data in an application has been created. Application level security granularity allows application data to be securely administered based on transactions or records even if the data is under the same enterprise applications. Alternatively, if lower security is required then application routers can be configured to share all data between different applications associated with one or more application routers.

Once security is determined and processed, application data travels over conventional network 122 carried by TCP/IP, SNA. Novell Netware or any oilier similar network protocol capable of providing access to a layered network communication model or any other equivalent, general purpose networking protocol. In practice, conventional network 122 also includes conventional routers, switches, repeaters and other networking devices familiar to those skilled in the art and used for general purpose broadband or local area networking. A VAN layer implemented in accordance with aspects of the present invention is carried over TCIP/IP or other native networking protocol providing a virtualized layer to interface between the applications and the underlying conventional network 122.

Application routers 112, 114, 116, 118 and 120 include conventional routing technology along with application routing functionality and visualization in accordance with implementations of the present invention. Application routing operations receive application data, convert the application data into a neutral format and then route the data to the appropriate application through one or more application routers in application network 104. For example, the neutral format can be implemented using an XMI, compatible language and protocol. Further, application routers convert the neutral format data back into a proprietary application protocol when communicating data back to an application.

Figure 2A:
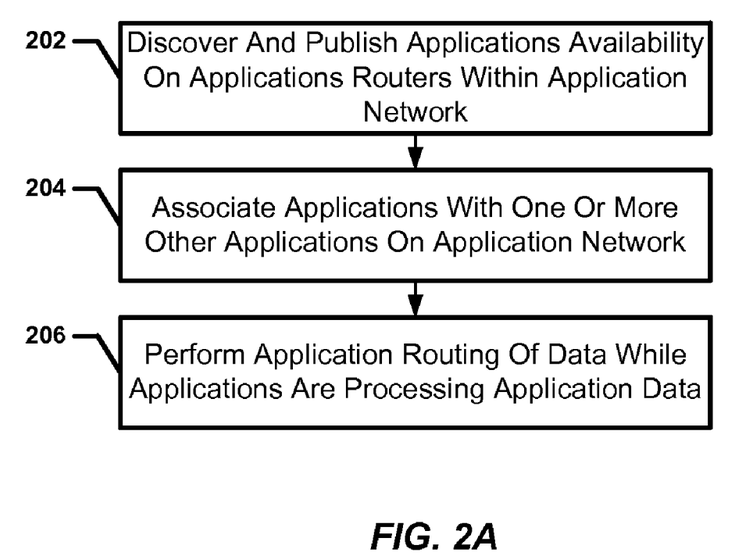
FIG. 2A is a flowchart diagram of the operations performed to integrate applications together using application routers and software in accordance with aspects of the present invention.

FIG. 2A is a flowchart diagram of the operations performed to integrate applications together using application routers and software in accordance with implementations of the present invention. Applications initially perform discovery of other applications by publishing the application availability on the application routers within the application network (202). Applications publish application information sufficient to identify data structures used by an application to carry information, interfaces describing access methods to these data structures and protocols for transmitting/receiving information over a network. This application information is often referred to as metadata as it provides descriptive details about the information without necessarily providing the underlying substantive information. For example, substantive information may include a public-key, encrypted password or other security information used to ensure a transaction is performed securely and confidentially.

Published information facilitates associating one application in the application network with one or more other applications on the application network (204). Application routers exchange metadata and other information about different applications and then associates the different applications together. This association process maps data fields from the data structures used in a first application, the source application, with corresponding data fields from the data structures of a second application, the target application.

Field type and other type processing performed in accordance with the implementations of the present invention ensure these field mappings are going to be compatible during run time. Many of the type compatibility issues deal with data formats and cardinality issues associated with groups of data. In some cases, lower level compatibility may require swapping byte order or filing data with default values to accommodate low-level formatting differences that may exist between data in the various data structures. Once the mapping has been assured, application routing commences between the source and target applications as they are processing application data (206).

Figure 2B:
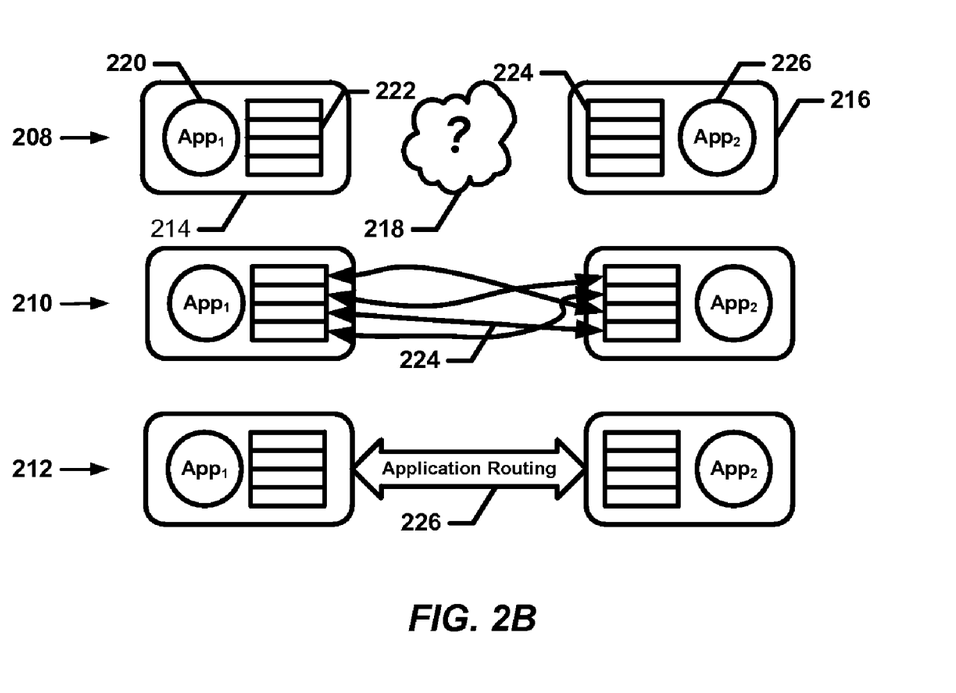
FIG. 2B is a pictorial depiction of the operations for integrating applications into the application network in accordance with aspects of the present invention.

FIG. 2B is a pictorial depiction of these aforementioned operations for integrating applications into the application network in accordance with the present invention. Applications are integrated through discovery 208, association or mapping 210 and then application routing 212. Once the mapping is complete, a virtualized layer provided by the VAN provides a uniform interface between applications and the native network making geography, security and differences that may exist between different nodes transparent to each application. As part of the integration process, $app_1$ 214 and $app_2$ 216 are placed within an application network 218 in accordance with the present invention in preparation for discover, association and routing operations. During discovery 208, $app_1$ 214 and $app_2$ 216 publish their availability on application network 218. Logic 220 and application 222 from $app_1$ 214 and logic 226 along with application data 224 from $app_2$ 216 are registered and made available on the application network 218.

Implementations of the present invention automatically or manually perform association 210 between $app_1$ 214 and $app_2$ 216 based upon the metadata thereby connecting application data 222 with application data 224 according to their respective logic 220 and logic 226. Mapped fields between $app_1$ 214 and $app_2$ 216 are further analyzed to determine compatibility during runtime. Field type incompatibilities may be modified in response to this analysis to ensure subsequent compatibility during runtime. Consequently, once these steps are complete, routing 212 performs application routing 226 is capable of facilitating applications exchange their respective pools of information.

Figure 3:
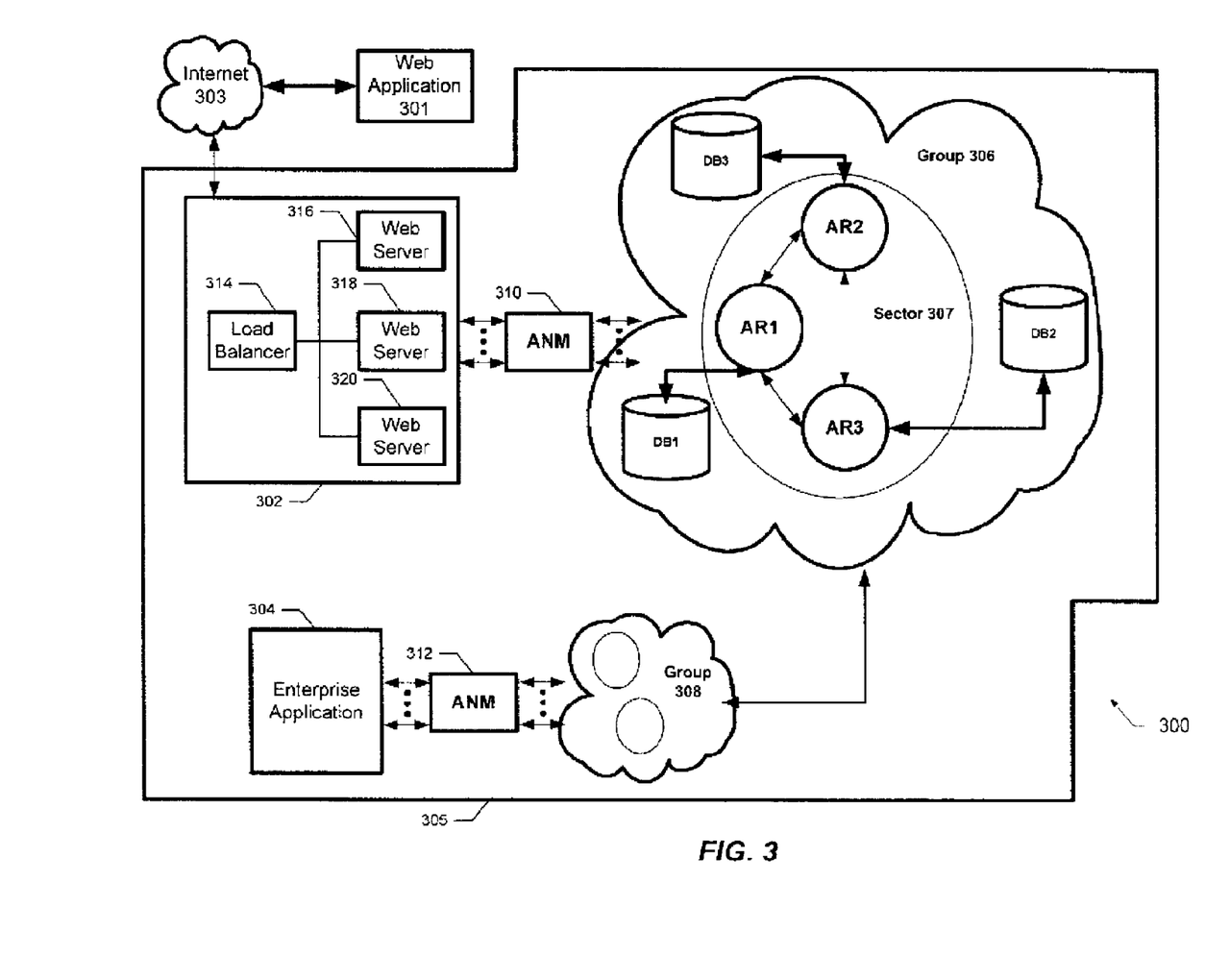
FIG. 3 illustrates an application network deployed over a virtual application network (VAN) layer in accordance with implementations of the present invention.

As previously described, integrating applications into enterprise networks is further complicated due to inconsistent protocols or versions, firewalls, security policies and other considerations peculiar to each combination of nodes on the network. Enterprise networks generally implement slightly different hardware and software solutions as different locations within an enterprise grow and/or are acquired. Accordingly, the application network 300 illustrated in FIG. 3 is deployed over a virtual application network (VAN) layer in accordance with implementations of the present invention to reduce complications due to these and other differences and simplify application layer communications.

In this example, a business has deployed a web application 301 made available over Internet 303 and an enterprise application 304 within the confines of corporate intranet 305. Generally, these and other enterprise types of applications require stateful operation and have complex interdependencies with specific timing and data processing requirements. For example, web application 301 could be a banking application that queries bank account information or a point-of-purchase interface for ordering manufactured products. In both cases, the web requests may depend on accessing several different computing resources with a complex set of interdependencies. These dependencies may include first accessing a banking database with bank account information to verify funds before a manufacturer will accept an order and manufacture certain materials or products. It may also include verifying from a raw materials database the availability and deliverability of certain raw materials involved in fulfilling the manufacturing order request.

Applications and other stateful processes use implementations of the present invention to distribute processing over application network 300. For example, a web request from web application 301 initially passes over Internet 303 and becomes demultiplexed through a load balancer 314 to one of web server 316, web server 318 or web server 320. These web servers 316, 318 and 320 send requests through a application network manager (ANM) identified in FIG. 3 as ANM 310 which in turn identifies an appropriate application router and computing resource to fulfill the request. While many combinations are possible, one arrangement assigns each ANM management of a single group having one or more sectors of application routers. In the example illustrated in FIG. 3. ANM 310 manages a group identified as group 306 having a single sector identified as sector 307 and containing application routers identified in this case as AR 1, AR 2 and AR 3 along corresponding computing resources used for storage referred to as database 1 (DB1), database 2 (DB2) and database 3 (DB3) respectively.

During configuration, an orchestration is created that represents an application and the distribution of processes associated with the application across application network 300. Different portions of the orchestration are downloaded to each ANM and AR in application network 300 depending on the particular configuration design. For example, the portion of the orchestration processed by AR 1, AR2, AR3 and corresponding databases DB1, DB2 and DB3 are managed by ANM 310. Because ANM 310 monitors these computing resources it may only be necessary to include certain "stubs" or identifiers from the orchestration into ANM 310 to achieve the necessary monitoring activities.

For example, the orchestration may specify that certain database requests are sent to certain application routers and contingent or dependant on results from other databases and application routers. One request from web application 301 may first require database information from DB1 and then DB2 before the request can be fulfilled. It is also possible thai the request from web application 301 is further processed by enterprise application 304 before it can be completed. This would further require the orchestration for the application to involve ANM 312 and computing resources and application routers from the two sectors depicted pictorially in group 308.

As described in further detail later herein, a VAN designed in accordance with implementations of the present invention makes communication across various nodes in application network 300 possible in a manner transparent to the application or applications of the orchestration. The VAN provides an additional layer of communication that bridges various geographies, security mechanisms and other differences in corporate intranet 305 or other enterprise networks and allows applications to communicate more directly. Applications can be more readily installed across an enterprise once the VAN has been configured to provide the necessary networking services. More importantly, the orchestration associated with an application can be redistributed within an enterprise without extensive work reconfiguring security, firewalls, protocols and other networking details.

Figure 4A:
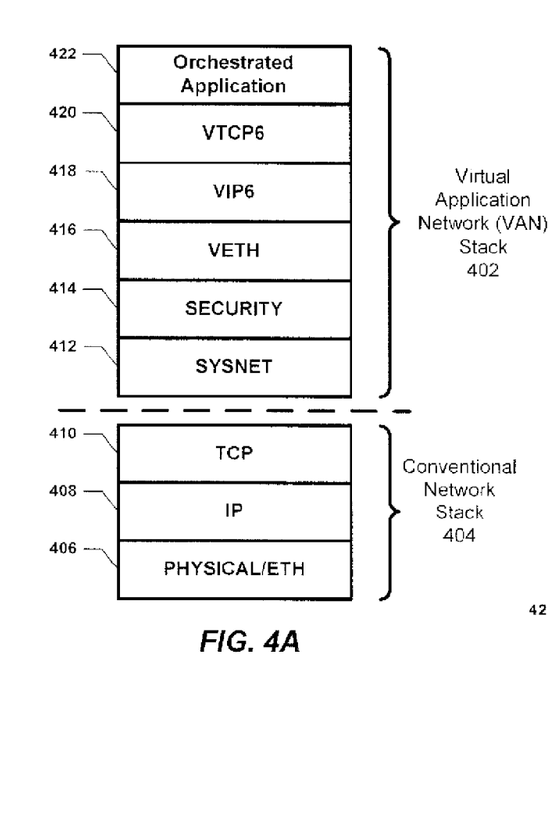
FIG. 4A depicts a virtual application network (VAN) stack diagram for implementing a VAN in an application network in accordance with aspects of the present invention.

FIG. 4A depicts a virtual application network (VAN) stack diagram for implementing a VAN in an application network in accordance with aspects of the present invention. As illustrated in this example, a VAN stack 402 designed in accordance with one implementation sits on top of and utilizes a conventional network stack 404 having a physical or Ethernet layer 406, an internet protocol (IP) layer 408 and a transport control protocol (TCP) layer 410. Whereas IP layer 408 deals with packets, TCP layer 410 enables establishment of connections and the exchange of streams of data. Further TCP layer 410 guarantees delivery of data in the same order they were sent while IP layer 408 resends lost packets and may deliver packets out of order. Firewalls, security mechanisms and other devices implemented in either or both TCP layer 410 and IP layer 408 may limit access to the overall application network until they are configured properly.

VAN stack 402 establishes at least one connection to the application network through conventional network stack 404 and facilitates subsequent communication between an orchestrated application and the underlying conventional network. The example VAN stack 402 virtualizes access to conventional network stack 404 through a sysnet layer 412. Sysnet layer 412 provides a data to the underlying conventional network 404 in a manner acceptable to the firewall, security and other mechanisms, if any, of conventional network 404. Instead of requiring multiple connections for each application, sysnet layer 412 combines packets from multiple applications and passes them through at least one network connection to the underlying conventional network stack 404.

Separately managed security layer 414 provides a variety of security mechanism for data passing through VAN stack 402. These security mechanisms including, but are not limited to SSL, IPSec, PPOE, Firewalls and other approaches. Virtual Ethernet layer 416 (VETH layer 416) simulates the physical Ethernet layer to process the packets of data received at the upper layers of VAN stack 402.

VIP6 layer 418 (virtual internet protocol version 6) simulates all aspects of a IP6 packet protocol including multicast, secure multicast and other more complicated protocols useful to an application. For example, VIP6 layer 418 makes multicasting protocol available to an application riding VAN stack 402 even though one or more nodes tin the underlying enterprise network may not readily accept such data streams. To maintain compatibility, an orchestrated application can communicate multicast with all nodes in the enterprise network allowing VAN stack 402 to convert those communications to a unicast communication when needed or leave the communication in multicast if possible. This greatly simplifies the integration of large scale distributed applications deployed across heterogeneous networks. It is also worth noting that many other protocol enhancements or variants of IP can also be deployed through VIP6 layer 418 as the VAN stack 402 ensures there is at least one connection available through various nodes in the underlying conventional network.

VTCP6 layer 420 (virtual transport communication protocol version 6) allows connection oriented communication with guaranteed delivery of packets in order of transmission and operates much like TCP layer 410 of conventional network stack 404. In this case, VTCP6 layer 420 may also carry orchestration information between various application network managers (ANM) and application routers (AR) to facilitate deployment of distributed and orchestrated applications. This orchestration information between the ANMs and ARs of the application network makes sophisticated distributed processing of applications possible. It also makes it possible to re-engineer and re-distribute such applications across modified topologies or different nodes in the application network without significant reconfiguration or re-engineering of the underlying conventional network.

Figure 4B:
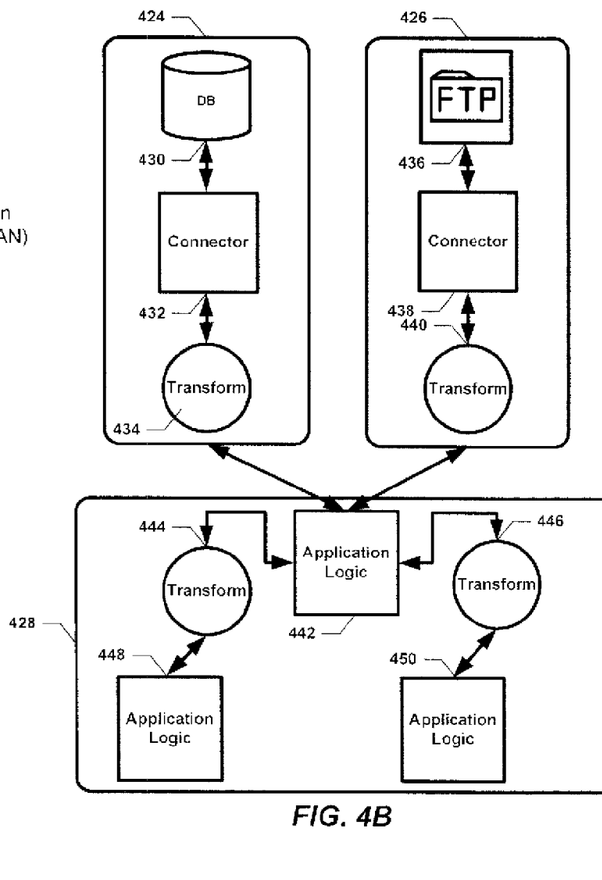
FIG. 4B depicts an example orchestration of an application and one possible distribution across an application network.

FIG. 4B depicts an example orchestration of an application and one possible distribution across an application network. In this example, the overall orchestration of the application includes a set of three suborchestrations or divisions in the application that include a first suborchestration 424, a second suborchestration 426 and a third suborchestration 428. Each suborchestration depends on a set of computer resources available on an application network and interdependences determined according to a business process from an enterprise. First suborchestration 424 uses a database type of computer resource identified as DB 312 and a connector 432 that delivers data to a transform operation 434. For example, connector 432 can be a message passing or other similar interprocess communication and transform operation 434 can represent data conversion from or to an XML-based dataset.

While it is not apparent from the illustration, first suborchestration 424 may be located on a single computer or a small cluster of computers in one geographic area or in a logical portion of the network. Second suborchestration 426 has an FTP-based computer resource 436, a connector 438 and a transform operation 440. This second suborchestration 426 may be separately created based on the availability of FTP-based computer resource 436 and the geographic distance from first suborchestration 424. However, it should be noted that both portions of the application in first suborchestration 424 and second suborchestration 426 do not need special network configuration or security exceptions to operate as they rely on services provided by the VAN layer as previously described. For example, first suborchestration 424 and second suborchestration 426 may each exist behind at least 2 different firewalls yet the VAN layer allows them to directly communicate without specially configuring the firewalls or other network devices at either end of the network.

Further, third suborchestration 428 is capable of receiving data from both first suborchestration 424 and second suborchestration 426 through connections provided by the VAN layer, VAN stack 402 in FIG. 4A provides a virtual connection as well as providing timing features to coordinate interdependencies of data arriving from the various suborchestrations of the application. In this example, third suborchestration 428 receives data into application logic 442 while also exchanging data with both a transform 444 and a transform 446. Additional application logic 448 and 450 may be necessary to operate on the data as required by the particular application and business requirements needed in the enterprise.

The VAN layer ensures one or more suborchestrations are able to communicate over the underlying conventional network without individually configuring each underlying node or nodes to accept the protocols required by the suborchestrations. The suborchestrations rely on the virtual communication paths setup and made available through services of VAN stack 402. Further, changes to the suborchestrations and use of computer resources does not require reconfiguration of the conventional network stack 402 as it is also taken care of by the VAN layer.

Figure 5:
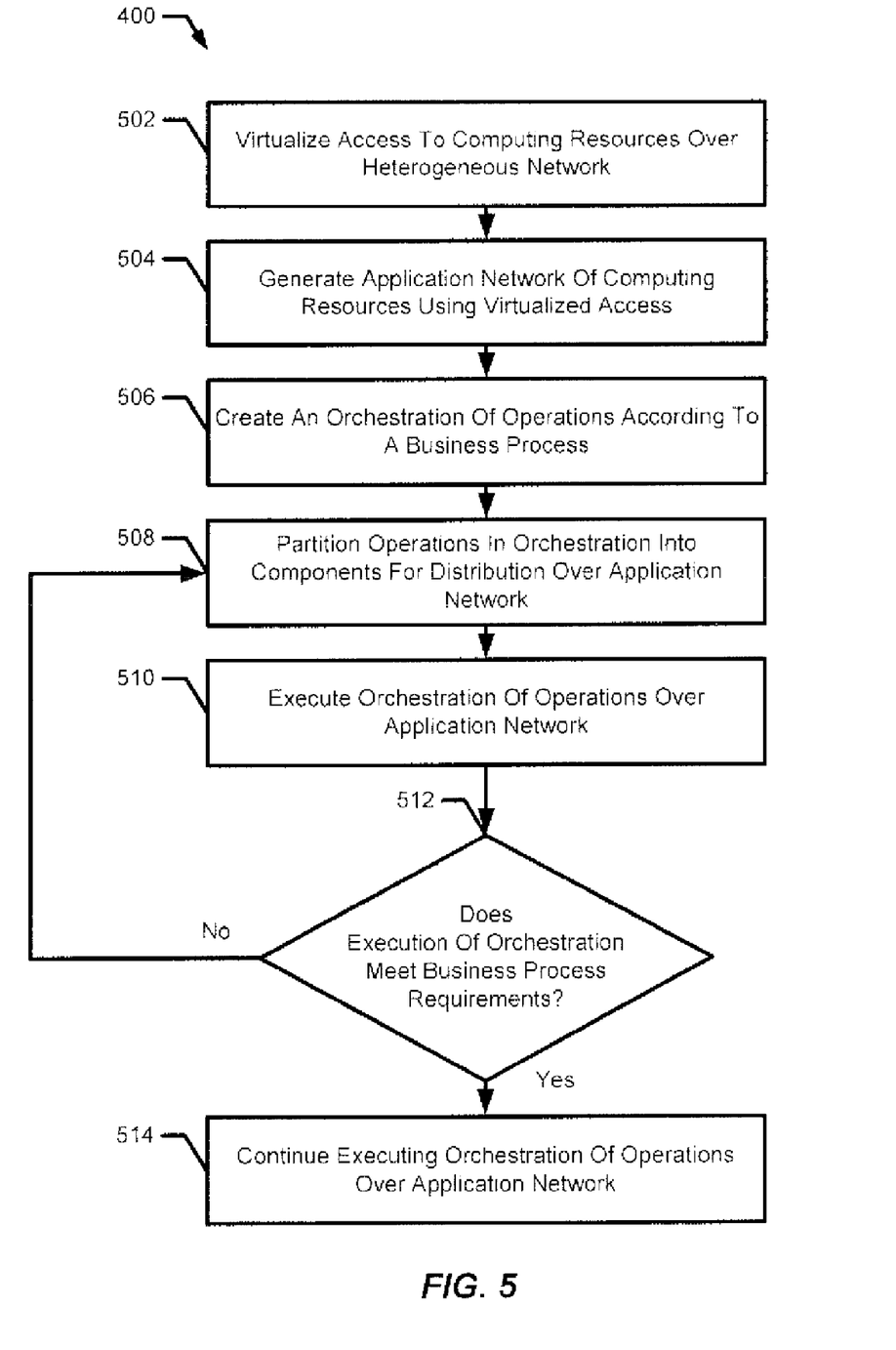
FIG. 5 is a flowchart diagram of the operations for creating a virtual application network and orchestrations distributed across enterprise networks in accordance with one implementation of the present invention.

FIG. 5 is a flowchart diagram of the operations for creating a virtual application network and orchestrations distributed across enterprise networks in accordance with one implementation of the present invention. To integrate an application into a network of computing resources, one implementation initially visualizes the access to the computing resources associated with a network through at least one network connection (502). Even on heterogeneous networks, the VAN layer is configured to have at least one connection to the conventional network. For example, this can be one or more unicast connections into the conventional network capable of connecting into the available computing resources. The virtualized access gives an orchestrated application or suborchestrations of the application a virtual connection with many different available protocols including multicast and other techniques.

Next, a VAN network is created by providing the application access to the network of computing resources through the virtualized access (504). Each of the connections between the application and the computing resources is opened and made ready for communication. For example, a single unicast connection to a conventional network can be used to simulate a multicast connection between one suborchestration of an application and another application or suborchestration.

With the connections made available, an orchestration of operations is created to manipulate the one or more computing resources according to a business process (506). The overall orchestration is a set of operations that reflects both the business process requirements and certain application requirements needed to address these business process requirements. In many cases, the orchestration may be initially designed as a monolithic solution and later divided according to the underlying enterprise network and infrastructure available.

Next, operations in the orchestration are partitioned into components to be distributed and executed over the virtual application network using the virtualized access (508). These components can be referred to as suborchestrations as they are contained within the original orchestration and coordinate many different computing resources; they can also be referred to simply as components. Division of the application into these suborchestrations or components is made in consideration of the underlying infrastructure and availability of computing resources.

Once the distribution of operations is complete, the application is executed as an orchestration of operations distributed across the virtual application network (510). Security, firewall and other issues associated with accessing underlying computer resources are taken care of through the VAN stack, and network. The orchestrated application does not need to be specially configured to perform multicast or pass through a firewalled portion of an enterprise network. These particulars are ensured before the application is configured and executed by way of the VAN layer.

A determination is made after execution to see if the operations being executed meet a set of business process requirements (512). These business process requirements can be performance oriented requirements, based on certain dependencies and datasets being available and ready at the proper times or any other evaluation criteria, for any of these or other reasons, the partitioning of the application can be adjusted in real-time to better fit the business processing requirements and a new orchestration of the application made (508). Major changes to the enterprise network are not required as the VAN layer handles necessary security, firewall or other networking issues. Alternatively, if the orchestration is appropriate then the orchestration of the operations for the application continues execution over the application network without modification (514).

Figure 6:
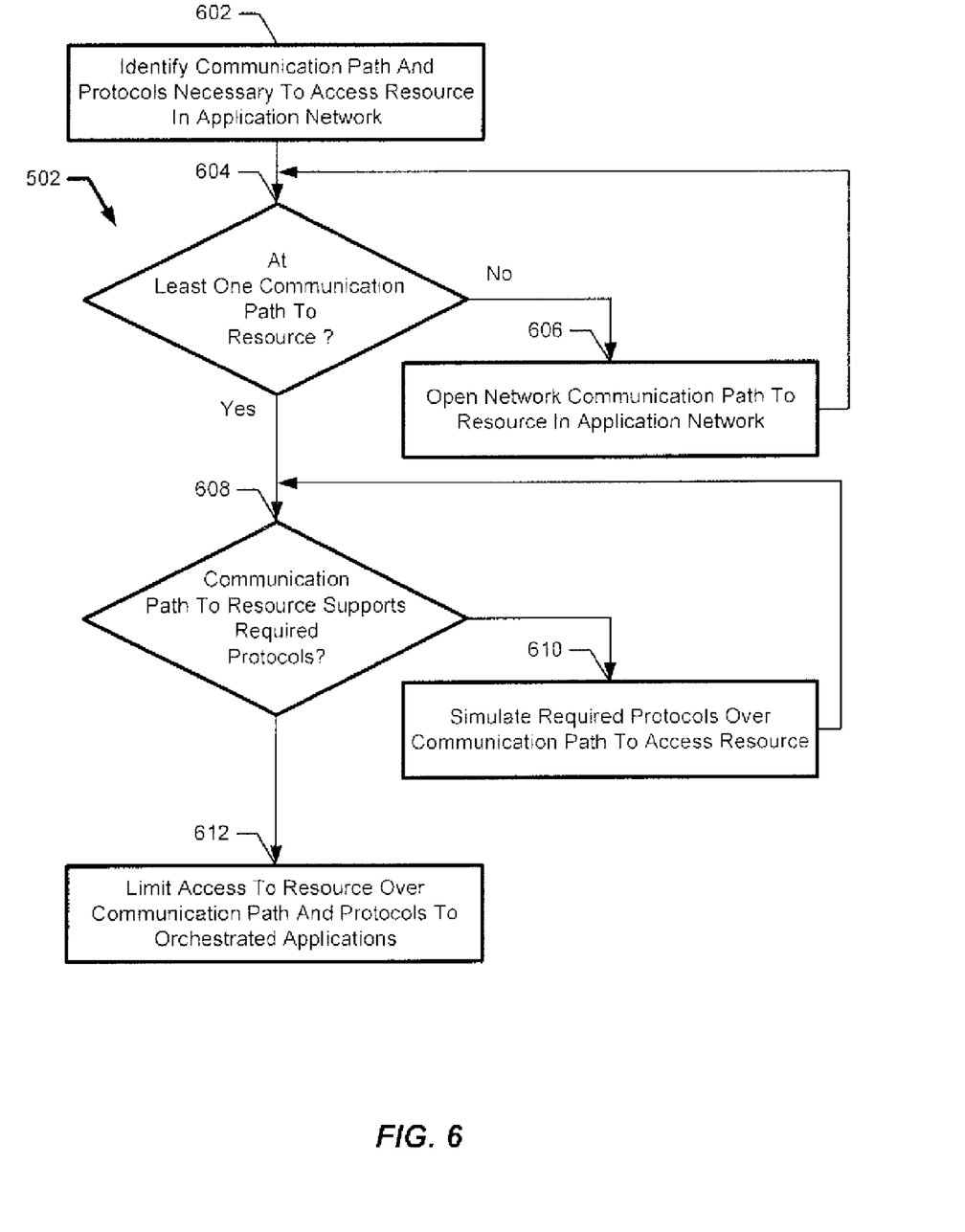
FIG. 6 is a flowchart diagram of the operations for ensuring a virtual application network can provide the necessary communications and protocols to an application.

FIG. 6 is a flowchart diagram of the operations for ensuring the VAN layer can provide necessary communications and protocols to an application. These operations detail visualizing access in step 502 of FIG. 5. To establish the visualized access, aspects of the invention identify a communication path and one or more protocols necessary for the application and related business process to access the computing resources (602). This analysis determines the connection requirements to the necessary computing resources as well as the protocol expected to be available by the application, for example, a multicast protocol may be required between an application and numerous manufacturing databases on a large enterprise network.

Assuming there is not at least one communication path capable of providing communication between the application and the computing resources of the network (604), it may be necessary to open a new network communication path to the computing resource in the application network (606). Of course, if it is not possible to establish at least one network connection to the computing resources then it may not be possible to virtualize the access.

Provided there is at least one communication path, a determination is made if the application has the required protocols (608). If the protocols needed are not available, aspects of the present invention simulate the one or more protocols necessary for the application using the communication path and an associated native protocol already available over the communication path (610). For example, implementations of the present invention may use one or more unicast connections to simulate a multicast connection across a firewall or otherwise secure point in an enterprise network that does not provide or allow multicast communications. To avoid unwanted network traffic across the VAN layer, aspects of the present invention may limit access to the computing resources and communication paths to orchestrated applications (612).

Figure 7:
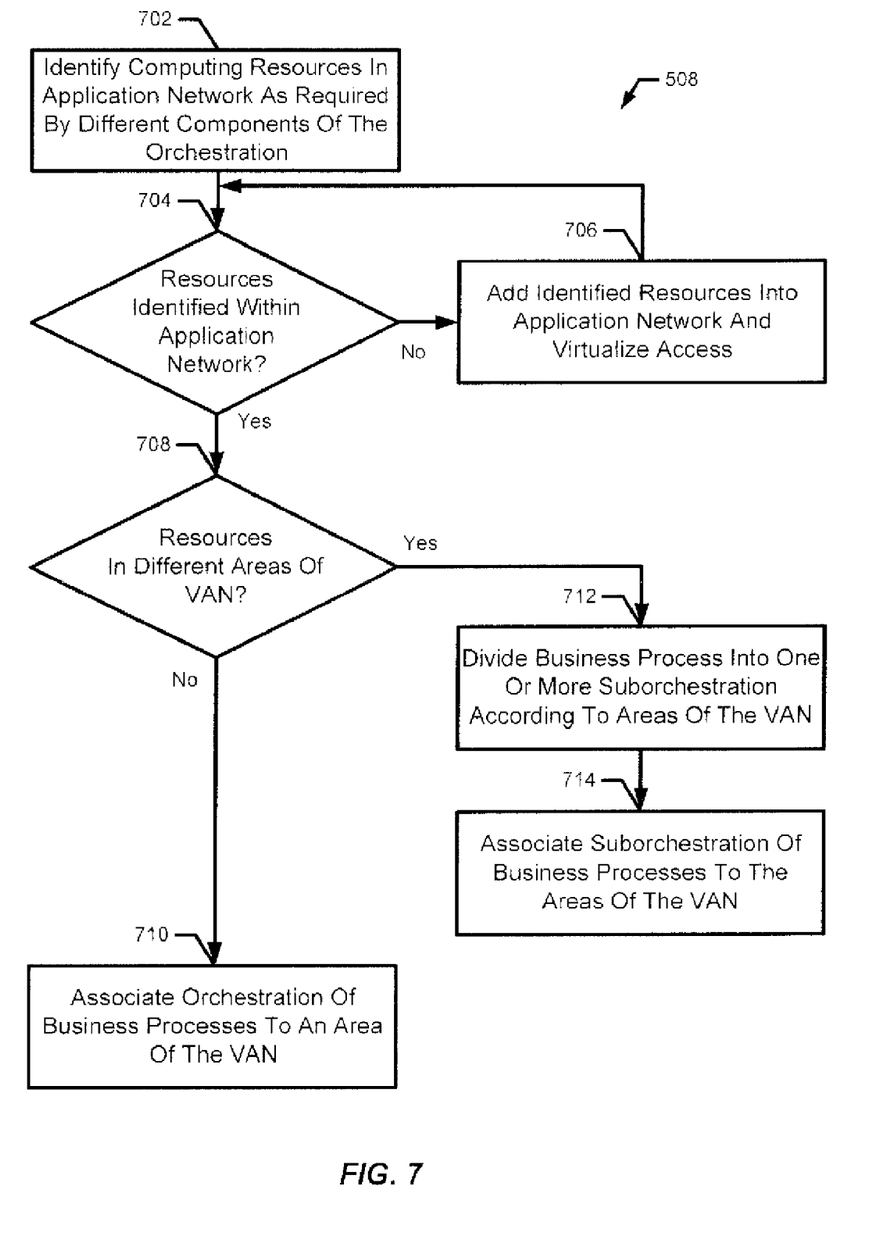
FIG. 7 is a flowchart diagram detailing the operations associated with partitioning the orchestration of operations in an application.

FIG. 7 is a flowchart diagram detailing the operations associated with partitioning the orchestration of operations in step 508 of FIG. 5. These operations provide an example of one approach for distributing the orchestrated application across the application network. The partitioning operations begin by identifying computing resources available over the application network and required by the components of the orchestration (702). In some cases, the application network searches for resources while in other cases the network resources are known and then provided to the application network during configuration. If resources are not available within the application network (704) the identified resources are added into the application network and access to the resources are virtualized through the VAN layer (706).

One implementation of the present invention determines areas that computing resources are available within the VAN (708). If computing resources fall into natural geographic areas or other areas that can be delineated then the divisions of the business process are made into one or more suborchestrations. These divisions generally correspond to the different geographic or other areas of the VAN having the requested computing resources (712). These divisions then lead to associating the one or more suborchestrations to the areas of the VAN having the identified computing resources, (714). Alternatively, it is also possible that the computing resources are in one area rather than multiple areas and thus the complete orchestration is associated with an area of the VAN and suborchestrations or additional components are not required (710). It should be understood that geographic area or any other area criteria represents only one possible solution for dividing an application into suborchestrations or components. Many other criteria mentioned previously directly, indirectly or alluded to in the previous description are also contemplated for distribution of an application across an enterprise.

Figure 8:
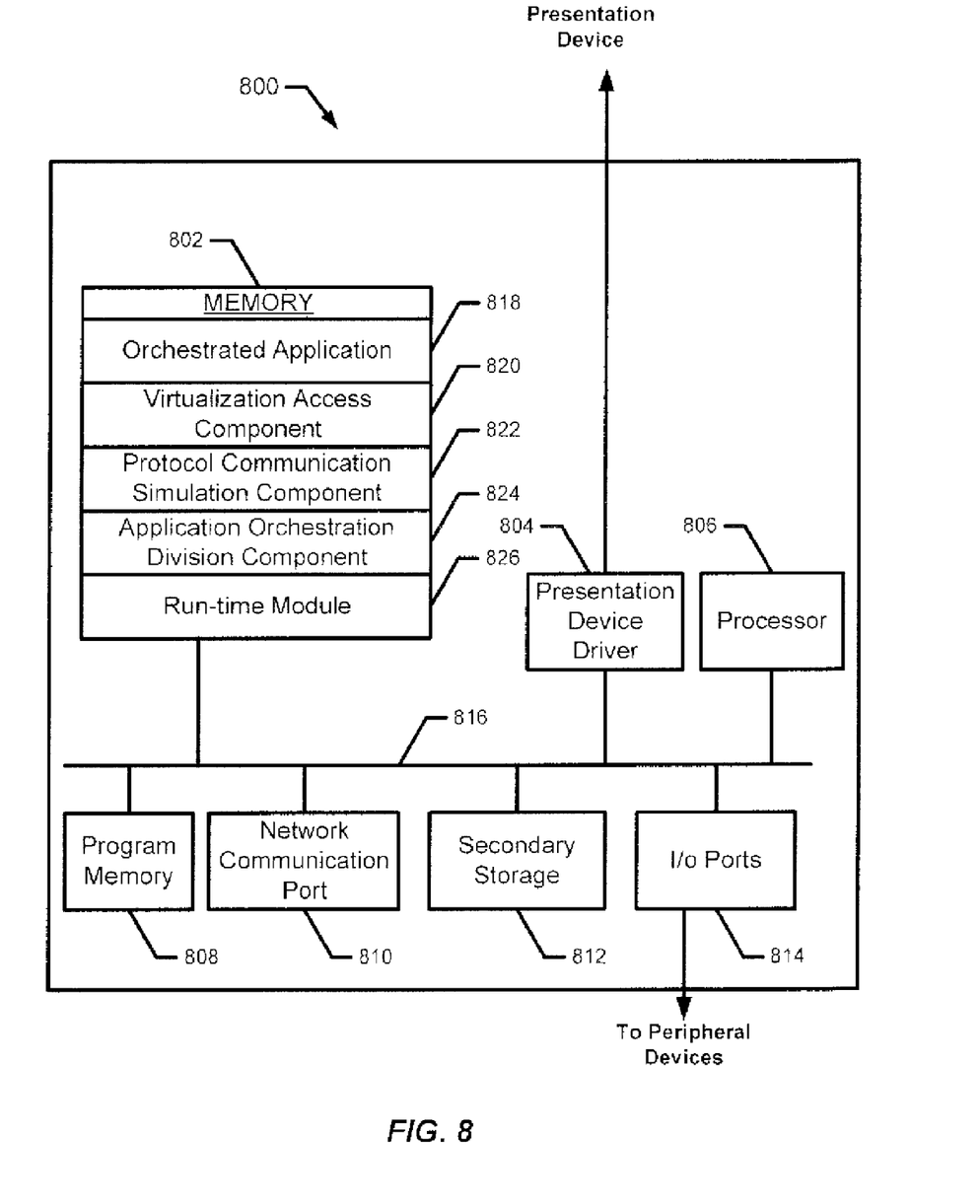
FIG. 8 is a block diagram of a system for performing one implementation of the present invention.

FIG. 8 is a block diagram of a system 800 used in one implementation for performing aspects of the present invention. System 800 includes a memory 802 to hold executing programs (typically random access memory (RAM) or writable read-only memory (ROM) such as a Hash ROM), a presentation device driver 804 capable of interfacing and driving a display or output device, a program memory 808 for holding drivers or other frequently used programs, a network communication port 810 for data communication, a secondary storage 812 with secondary storage controller, and input/output (I/O) ports 814 also with I/O controller operatively coupled together over a bus 816. In addition to implementing the present invention using a conventional personal computer or server, system 800 can be preprogrammed, in ROM, for example, using field-programmable gate array (FPGA) technology or it can be programmed (and reprogrammed) by loading a program from another source (for example, from a floppy disk, a CD-ROM, or another computer). Also, system 800 can be implemented using customized application specific integrated circuits (ASICs).

In one implementation, memory 802 includes an orchestrated application 818 to be distributed for execution across an application network, visualization access component 820, a protocol communication simulation component 822, an application orchestration division component 824 and a run-lime module 826 that manages system resources used when processing one or more of the above components on system 800.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data, and instructions to a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks: magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks: and CD ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A computer implemented method comprising:
   integrating an application into a network of computing resources, comprising:
   virtualizing access to one or more computing resources associated with a network through at least one network connection using a virtualized application network stack layered over a native heterogeneous network, wherein virtualizing access comprises:
   identifying a communication path and one or more protocols necessary for the application and related business process to access the computing resources of the network;
   determining if there is at least one communication path capable of providing communication between the application and the computing resources of the network; and
   simulating the one or more protocols necessary for the application using the communication path and an associated native protocol already available over the communication path in response to the determination that there is at least one communication path;
   generating a virtual application network using the virtualized application network stack capable of providing the application access to the network of computing resources, wherein the virtualized application network abstracts, through the virtualized access provided by the virtualized application network stack, at least one of data standards, protocols, permissions, and authorizations required to access to the one or more computing resources without reconfiguring the network or its security permissions;

creating an orchestration of operations to manipulate the one or more computing resources through the virtualized access according to a business process; and partitioning the operations in the orchestration into components to be distributed and executed over the virtual application network using the virtualized access.

2. The method of claim 1 wherein the network is a heterogeneous combination of protocols and security measures.

3. The method of claim 2 wherein the security measures are selected from a set of security measures including: IPSec and PPOE.

4. The method of claim 1 further comprising, executing the orchestration of operations distributed across the virtual application network.

5. The method of claim 1 further comprising:

executing the orchestration of operations distributed across the virtual application network;

determining if the operations being executed meet a set of business process requirements; and manipulating the partitioned operations in the orchestration to meet the set of business process requirements directly through the virtualized access of the network of computing resources in the virtual application network.

6. The method of claim 1, further comprising:

opening a network communication path between the application and the computing resources of the network in response to the determining that there is not at least one communication path already capable of providing communication between the application and the computing resources of the network.

7. The method of claim 1, further comprising:

limiting access to the one or more computing resources over the virtualized application network to the orchestrated applications.

8. The method of claim 1 where partitioning the operations in the orchestration into components, further comprises:

identifying computing resources available over the virtual application network and required by the components of the orchestration;

determining areas that computing resources are available within virtual application network for use by the orchestration of components associated with the business process;

dividing the business process into one or more suborchestrations that correspond to the areas of the virtual application network having the computing resources; and associating the one or more suborchestrations to the areas of the virtual application network having the identified computing resources.

9. A system, comprising:

one or more computer processors;

a memory containing instructions, which, when executed by the one or more processors, performs an operation for integrating an application into a network of computing resources, the operation comprising:

virtualizing access to one or more computing resources associated with a network through at least one network connection using a virtualized application network stack layered over a native heterogeneous network, wherein virtualizing access comprises:

identifying a communication path and one or more protocols necessary for the application and related business process to access the computing resources of the network;

determining if there is at least one communication path capable of providing communication between the application and the computing resources of the network; and simulating the one or more protocols necessary for the application using the communication path and an associated native protocol already available over the communication path in response to the determination that there is at least one communication path;

generating a virtual application network using the virtualized application network stack capable of providing the application access to the network of computing resources, wherein the virtualized application network abstracts, through the virtualized access provided by the virtualized application network stack, at least one of data standards, protocols, permissions, and authorizations required to access to the one or more computing resources without reconfiguring the network or its security permissions;

creating an orchestration of operations to manipulate the one or more computing resources through the virtualized access according to a business process; and partitioning the operations in the orchestration into components to be distributed and executed over the virtual application network using the virtualized access.

10. The system of claim 9 wherein the network is a heterogeneous combination of protocols and security measures.

11. The system of claim 10 wherein the security measures are selected from a set of security measures including: IPSec and PPOE.

12. The system of claim 9, the operation further comprising:

executing the orchestration of operations distributed across the virtual application network.

13. The system of claim 9, the operation further comprising:

executing the orchestration of operations distributed across the virtual application network;

determining if the operations being executed meet a set of business process requirements; and manipulating the partitioned operations in the orchestration to meet the set of business process requirements directly through the virtualized access of the network of computing resources in the virtual application network.

14. The system of claim 9, the operation further comprising:

opening a network communication path between the application and the computing resources of the network in response to the determining that there is not at least one communication path already capable of providing communication between the application and the computing resources of the network.

15. The system of claim 9, the operation further comprising:

limiting access to the one or more computing resources over the virtualized application network to the orchestrated applications.

16. The system of claim 9, wherein partitioning the operations in the orchestration into components comprises:

identifying computing resources available over the virtual application network and required by the components of the orchestration;

determining areas that computing resources are available within virtual application network for use by the orchestration of components associated with the business process;

dividing the business process into one or more suborchestrations that correspond to the areas of the virtual application network having the computing resources; and associating the one or more suborchestrations to the areas of the virtual application network having the identified computing resources.

17. A computer program product, tangibly stored on a non-transitory computer readable medium, comprising instructions operable to cause a programmable processor to:

integrate an application into a network of computing resources, comprising:

virtualizing access to one or more computing resources associated with a network through at least one network connection using a virtualized application network stack layered over a native heterogeneous network, wherein virtualizing access comprises:

identifying a communication path and one or more protocols necessary for the application and related business process to access the computing resources of the network;

determining if there is at least one communication path capable of providing communication between the application and the computing resources of the network; and simulating the one or more protocols necessary for the application using the communication path and an associated native protocol already available over the communication path in response to the determination that there is at least one communication path;

generating a virtual application network using the virtualized application network stack capable of providing the application access to the network of computing resources, wherein the virtualized application network abstracts, through the virtualized access provided by the virtualized application network stack, at least one of data standards, protocols, permissions, and authorizations required to access to the one or more computing resources without reconfiguring the network or its security permissions;

creating an orchestration of operations to manipulate the one or more computing resources through the virtualized access according to a business process; and partitioning the operations in the orchestration into components to be distributed and executed over the virtual application network using the virtualized access.

18. The computer program product of claim 17, further comprising:

executing the orchestration of operations distributed across the virtual application network;

determining if the operations being executed meet a set of business process requirements; and manipulating the partitioned operations in the orchestration to meet the set of business process requirements directly through the virtualized access of the network of computing resources in the virtual application network.

19. The computer program product of claim 17, wherein partitioning the operations in the orchestration into components further comprises:

identifying computing resources available over the virtual application network and required by the components of the orchestration;

determining areas that computing resources are available within virtual application network for use by the orchestration of components associated with the business process;

dividing the business process into one or more suborchestrations that correspond to the areas of the virtual application network having the computing resources; and associating the one or more suborchestrations to the areas of the virtual application network having the identified computing resources.

* * * * *